United States Patent [19]

Shields

[11] 4,168,868
[45] Sep. 25, 1979

[54] SEALING SYSTEM FOR AN EARTH BORING CUTTER

[75] Inventor: Santos Shields, Arlington, Tex.
[73] Assignee: Dresser Industries, Inc., Dallas, Tex.
[21] Appl. No.: 925,131
[22] Filed: Jul. 17, 1978
[51] Int. Cl.² .......................... F16C 33/78; F16J 15/34
[52] U.S. Cl. ..................................... 308/8.2; 175/372; 277/95; 277/177; 308/187.1
[58] Field of Search ................... 308/8.2, 36.1, 187.1; 175/371, 372; 277/83, 92, 94, 95, 176, 177

[56] References Cited

U.S. PATENT DOCUMENTS

| | | | |
|---|---|---|---|
| 3,656,764 | 4/1972 | Robinson | 308/8.2 |
| 3,862,762 | 1/1975 | Millsap | 308/8.2 |
| 3,944,306 | 3/1976 | Neilson | 308/8.2 |
| 4,132,418 | 1/1979 | Roli | 277/92 |

FOREIGN PATENT DOCUMENTS 1260080 3/1961 France ..................................... 175/372

Primary Examiner—Charles E. Frankfort
Attorney, Agent, or Firm—Eddie E. Scott

[57] ABSTRACT

A sealing system acts as a barrier to the drilling fluid, pulverized cuttings and other materials in the borehole preventing the materials from entering the bearing area of an earth boring cutter and retains lubricant inside the bearing area. At least one bearing pin extends from the body of an earth boring bit and a rolling cutter is mounted on the bearing pin. A seal assembly is located between the mouth of the cutter and the bearing pin. The seal assembly includes an "O" ring and a washer ring. The washer ring has a semi-circular or semi-elliptical cross section.

5 Claims, 4 Drawing Figures

4,168,868

SEALING SYSTEM FOR AN EARTH BORING CUTTER

TECHNICAL FIELD

The present invention relates to the art of earth boring and, more particularly, to a rotary rock bit with improved means for sealing the bearings of the bit from materials in the borehole and retaining lubricant within the bearing area.

BACKGROUND OF THE INVENTION

The present invention is especially adapted for use with rock bits popularly known as three-cone rotary rock bits; however, its use is not restricted thereto, and the present invention can be used in other types of rotary rock bits. A three-cone rotary rock bit consists of a main bit body adapted to be connected to a rotary drill string. The bit includes three individual rotatable cone cutters mounted on three individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant must be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A three-cone rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cone cutters. They have provided a longer useful lifetime for the cone cutters. This has resulted in the bearing systems of the bit being often the first to fail during the drilling operation. Consequently, a need exists for new and improved bearing systems to extend the useful lifetime of the bit and to allow development of other elements that interact with the sealing and bearing systems. In attempting to improve the bearing systems, various seal systems have been provided to maintain the bearing area free of harmful materials and retain lubricant. In attempting to provide new sealing systems, great care must be taken that the overall capacity of the bearing system is not reduced.

DESCRIPTION OF THE PRIOR ART

In U.S. Pat. No. 3,397,928 to E. M. Galle patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface on the shaft. A resilient packing ring is positioned in a groove in one of the surfaces. The packing ring, the groove and an opposing surface are sized such that upon assembly of the cutter element upon the shaft the cross sectional thickness of the packing ring is compressed by not less than substantially 10% of this thickness prior to assembly of the cutter element upon the shaft.

SUMMARY OF THE INVENTION

The present invention provides an improved sealing system for a rotary rock bit that acts as a barrier to the drilling fluid, pulverized cuttings and other materials in the borehole to prevent the materials from entering the bearing area of the bit and retains lubricant within the said bearing area. A bit body is provided. A bearing pin extends from the bit body. A rolling cone cutter is rotatably mounted on the bearing pin. Bearing means are located between the rolling cutter and the bearing pin upon which it is mounted. The rolling cutter has a cutter mouth. A washer ring element is positioned in said cutter mouth around the bearing pin and is located between said bearing pin and said rolling cutter. The washer ring element has a generally semi-circular cross section. An "O" ring is mounted within said cutter mouth inside of said washer ring element.

The unique seal of the present invention can be shown to have a number of important features not existing in the prior art. It is, however, to be understood that the scope of the present invention is defined by the claims at the end of this specification and a general description of the prior art and distinctions thereover is not to be interpreted as limiting the coverage of the present invention. Previous "O" ring seal configurations employed flat edge bearing surfaces which result in pinching of the "O" ring because it tended to squeeze between two interfaces of the gland seal components. The present invention provides a small volume annular cavity at top and bottom of the "O" ring/washer interface for material expansion, rather than into the interface as in the prior art. The above and other features and advantages of the present invention will become apparent upon consideration of the following detailed description of the invention when taken in conjunction with the accompanying drawings.

DETAILED DESCRIPTION OF THE INVENTION

Figure 1:
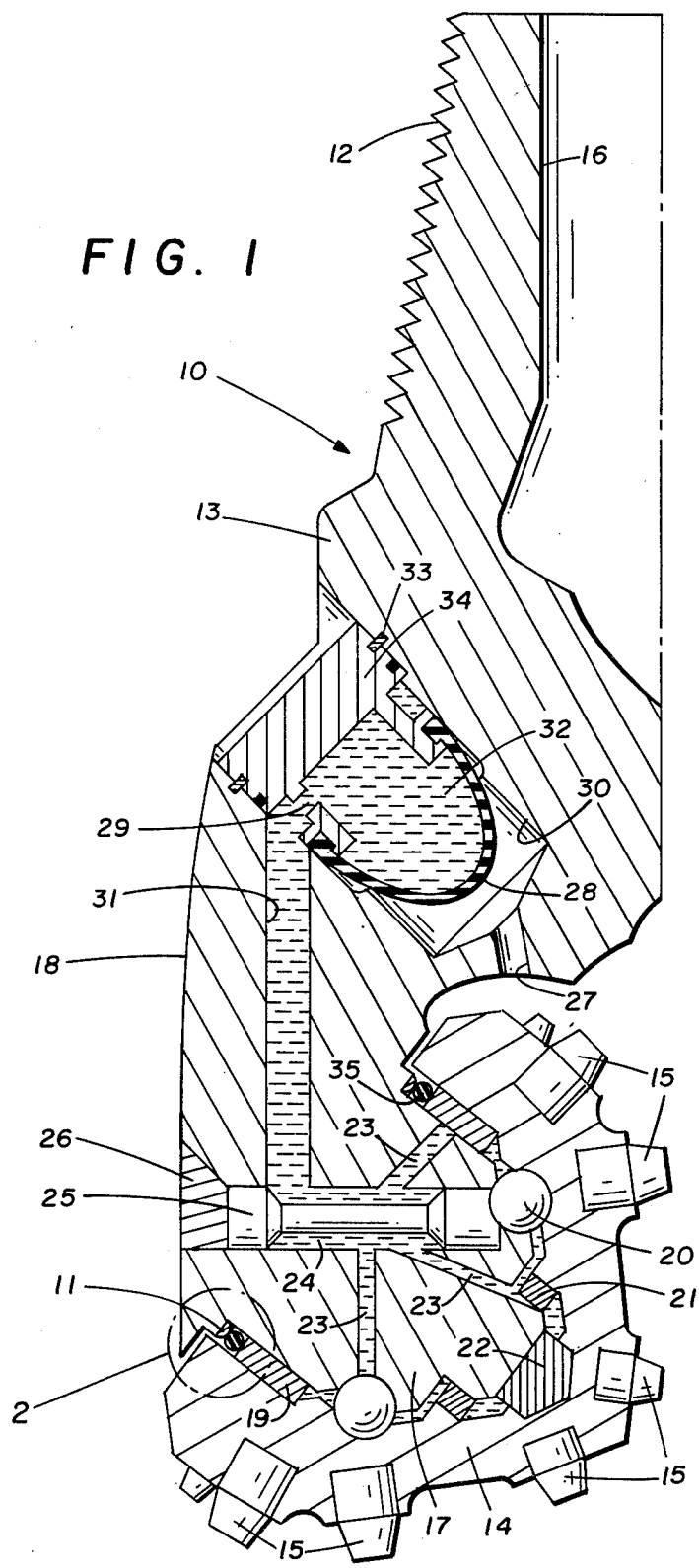
FIG. 1 is an illustration of an earth boring bit constructed in accordance with the present invention.

Referring now to FIG. 1, a sectional view of one arm 18 of a three-cone rotary rock bit 10 is shown. It is to be understood that the structure of the other two arms are substantially identical to the arm 18. A cutter 14 is rotatably positioned on the journal portion or bearing pin 17 of the arm 18 and adapted to disintegrate the earth formations as the bit 10 is rotated. The bearing pin 17 projects from the cutter receiving surface of the arm 18. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used at the cutting structure on the cone cutter 14.

The body 13 of the bit 10 includes an upper threaded portion 12 that allows the bit 10 to be connected to the lower end of a rotary drill string (not shown). The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the cutter 14 and the bearing pin 17. The bearing systems in the bearing area include an outer friction bearing 19, a series of ball bearings 20, an inner friction bearing 21, and a thrust button 22. A seal assembly is positioned between the cutter 14 and the bearing pin 17. The seal assembly includes washer ring 11 and "O" ring 35 that act to retain lubricant in the bearing area around the bearing systems and prevent any materials in the well bore from entering the bearing area. Passageways 23 and 24 are provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 17. After the balls are in place, a plug 25 is inserted into the passageway 24 and welded therein by weld 26. Plug 25 has a reduced diameter throughout the major portion of its length to allow lubricant to be transmitted to the bearing area. The additional passageways 23 extend from passageway 24 to the bearing area to insure a sufficient supply of lubricant to bearings 19, 20, 21 and 22.

A bore 30 extends into the body 13 from the surface of the bit body. A passage 31 extends from the bore 30 to the passageway 24. A lubricant reservoir 32 is located in the bore 30. The lubricant reservoir 32 is located between a flexible diaphragm 28 and a reservoir cap 34. An "O" ring seal prevents borehold fluid from by-passing the upper portion of the reservoir cap 34 and lubricant within the lubricant reservoir 32 from escaping into the borehole. A retaining ring 33 holds reservoir cap 34 in position in bore 30. The flexible diaphragm 28 prevents lubricant in the lubricant reservoir 32 from escaping into the bore 30 and fluid in the borehole that has entered bore 30 through passage 27 from entering the lubricant reservoir 32. Lubricant within the lubricant reservoir 32 is channeled into the passage 31 through opening 29 and is directed to the bearings.

Figure 2:
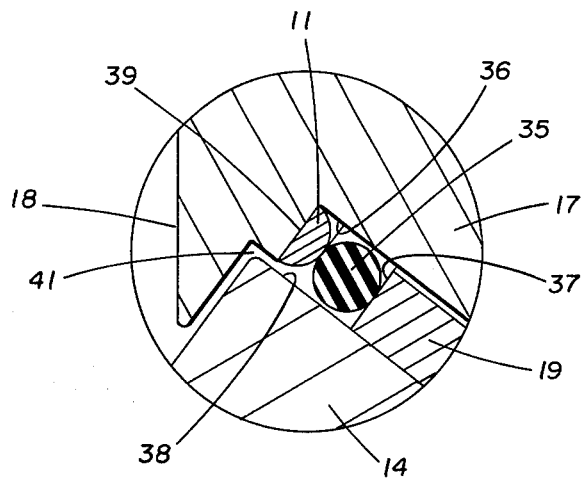
FIG. 2 is an enlarged view illustrating the seal assembly of the bit shown in FIG. 1.

Referring now to FIG. 2, an enlarged view of a portion of the arm 18, the cone 14 and the seal assembly is shown. The seal assembly is positioned between a surface 36 on the bearing pin 17 and a surface 38 on the cone cutter 14. The seal assembly is also positioned between a receiving surface 39 on the arm 18 and a surface 37 on the bearing element 19. The seal assembly provides an improved sealing system that acts as a barrier to the drilling fluid, pulverized cuttings and other materials in the borehole to prevent the materials from entering the bearing area of the bit and retains lubricant within said bearing area. The washer ring 11 is positioned in the mouth of the cutter 14 around the bearing pin 17. The washer ring 11 has a semi-circular or semi-elliptical cross section. The "O" ring 35 is mounted within the cutter mouth inside of the washer ring 11.

Figure 3:
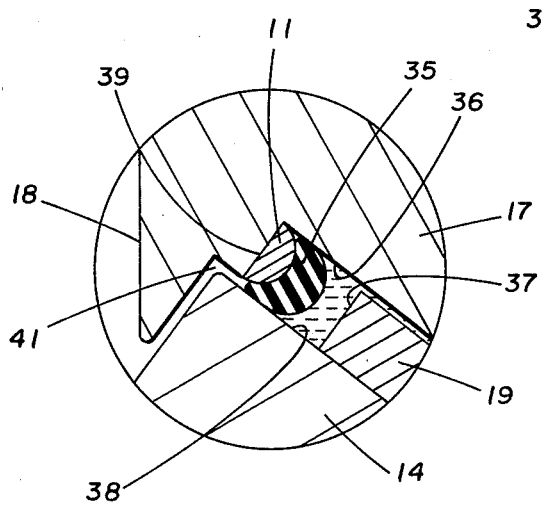
FIG. 3 illustrates the pressure loading of the seal assembly shown in FIGS. 1 and 2.

The structural details of an earth boring bit 10 constructed in accordance with the present invention having been described, the operation of the bit 10 will now be considered with reference to FIGS. 2 and 3. The lubrication system of the bit 10 is filled with a suitable lubricant. The area within the flexible diaphragm 28 provides a reservoir of lubricant. The flexible diaphragm 28 seals the lower end of the lubricant reservoir and is held in place by the cap 34. The bit 10 will be lowered into a well bore until the cutter 14 contacts the earth formations at the bottom of the borehole. The hydrostatic pressure of fluid in the well bore is substantial. The lubrication system of the bit 10 allows the pressure of fluid in the well bore to be transmitted to the lubricant reservoir through passage 27 to the lubricant through diaphragm 28. This allows the pressure of lubricant inside the bit and fluid in the borehole to be equalized as the bit 10 is moved through the borehole. Lubricant from the lubricant reservoir can migrate through passages 31, 24 and 23 and be transmitted to the bearing systems.

The bit 10 is rotated and thrust downward, thrusting the cutter 14 against the earth formations. Continued rotation with the weight of the drill string applying a thrust force to the bit 10 causes the cutters to disintegrate the formations and form the desired borehole. Internal pressure of lubricant within the bit 10 will tend to force the "O" ring seal 35 outward into the opening 41 between the cutter 14 and the bearing pin 17. As shown in FIG. 3, the washer ring 11 prevents the "O" ring 35 from being pinched between the cutter 14 and the bearing pin 17. Previous "O" ring seal configurations employed flat edge bearing surfaces which result in pinching of the "O" ring because it tended to squeeze between two interfaces of the gland seal components. The present invention provides a small volume annular cavity at top and bottom of the "O" ring/washer interface for material expansion, rather than into the interface as in the prior art.

The cross section of the washer ring 11 is semi-circular in the preferred configuration, but may also be semi-elliptical, however, the cross section is not limited to these two shapes. The washer ring may be of other shape having one flat surface and the remaining surfaces so configured as to provide two annular spaces at top and bottom of the washer ring. These spaces provide room into which "O" ring material may be squeezed during bit operation. The flat side of the semi-circular washer ring 11 fits against the surface 39 on the bearing pin 17. The curved surface of the washer ring 11 faces the "O" ring seal 35. As shown in FIG. 3, when the internal pressure of lubricant within the bit forces the "O" ring seal outward toward the opening 41, the "O" ring seal 35 will become deformed around the curved side of the washer ring 11. The washer ring therefore does not "see" any sharp corners and is prevented from becoming pinched as in the prior art. The curved surface of the washer ring 11 provides a greater area for the "O" ring 35 to deform around. The washer ring 11 may be made of plastic, leather, metal or other materials. The "O" ring 35 may be made of any suitable "O" ring material. The washer material should be harder than the "O" ring material.

Figure 4:
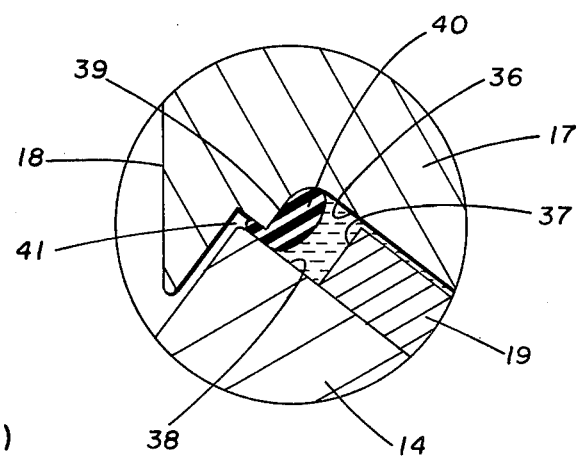
FIG. 4 is a cross sectional view of a seal element of the prior art.

Referring now to FIG. 4, an illustration of the problem encountered with prior art "O" rings will be described. A prior art "O" ring 40 is shown positioned in the same seal cavity as the seal assembly of the present invention. Internal pressure of lubricant within the bit 10 will tend to force the prior art "O" ring seal 40 outward toward the opening 41 between the rotating cutter 14 and the bearing pin 17. The prior art "O" ring 40 will deform and attempt to move into the gap 41. Because of the relative rotation between rolling cutter 14 and bearing pin 17, the prior art "O" ring having been pinched into the opening 41 will become damaged during operation. The present invention overcomes this problem by preventing the "O" ring from moving into this pinched configuration.

The embodiments of the invention in which an exclusive property or privilege is claimed are defined as follows:

1. In an earth boring bit having a bit body, a bearing shaft extending from said bit body, a rolling cutter adapted to be rotatably mounted on said bearing shaft, lubricant between said bearing shaft and said rolling cutter and a seal assembly between said rolling cutter and said bearing shaft wherein said lubricant can produce internal pressure acting on said seal assembly, the improvement comprising:

said seal assembly including
an "O" ring of deformable material positioned around said bearing shaft between said bearing shaft and said rolling cutter with said lubricant contacting said "O" ring and said internal pressure acting on said "O" ring, and
a hard washer ring positioned around said bearing shaft between said bearing shaft and said rolling cutter with said "O" ring contacting said washer ring and said internal pressure acting on said "O" ring forcing said "O" ring onto said washer ring, said washer ring having a substantially semi-circular cross section with a curved side, said curved side contacting said "O" ring wherein said internal pressure will cause said "O" ring to deform onto said curved side of said washer ring.

2. An earth boring bit comprising:
a bit body;
a bearing shaft extending from said bit body;
a rolling cutter rotatably mounted on said bearing shaft, said rolling cone cutter having a cutter mouth;
lubricant between said bearing shaft and said rolling cutter, said lubricant producing internal pressure; and
a seal assembly positioned around said bearing shaft within said cutter mouth between said bearing shaft and said rolling cutter, said seal assembly including a hard washer ring having a substantially semi-circular cross section positioned within said open mouth, said washer ring semi-circular cross section providing a curved side and an "O" ring of deformable material positioned within said open mouth inside of said washer ring wherein said internal pressure causes said lubricant to force said "O" ring to deform onto said curved side of said hard washer ring.

3. The earth boring bit of claim 2 wherein said washer ring curved side is positioned adjacent said "O" ring.

4. An earth boring bit, comprising:
a bit body;
a bearing pin extending from said bit body;
a rolling cone cutter rotatably mounted on said bearing pin, said rolling cone cutter having a cone mouth;
lubricant between said bearing pin and said rolling cone cutter, said lubricant producing internal pressure; and
a seal assembly positioned around said bearing pin within said cone mouth and located between said bearing pin and said rolling cone cutter, said seal assembly including an "O" ring of deformable material positioned around said bearing pin within said cone mouth and a washer ring of hard material positioned around said bearing pin within said cone mouth, said washer ring having a substantially semi-circular cross section with a curved side, said washer ring positioned within said cone mouth with said curved side facing said "O" ring and said "O" ring positioned inside said washer ring wherein said internal pressure will force said "O" ring to deform onto said curved side of said washer ring.

5. An earth boring bit, comprising:
a bit body;
a bearing pin extending from said bit body;
a rolling cone cutter rotatably mounted on said bearing pin, said rolling cone cutter having a cone mouth;
lubricant between said bearing pin and said rolling cone cutter, said lubricant producing internal pressure; and
a seal assembly positioned around said bearing pin within said cone mouth and located between said bearing pin and said rolling cone cutter, said seal assembly including an "O" ring of deformable material positioned around said bearing pin within said cone mouth and a washer ring of hard material positioned around said bearing pin within said cone mouth, said washer ring having a semi-circular or semi-elliptical cross section with a curved side, said washer ring positioned within said cone mouth with said curved side facing said "O" ring and said "O" ring positioned inside of said washer ring between said washer ring and said lubricant wherein said internal pressure will force said "O" ring to deform onto the curved side of said washer ring.

* * * * *